(12) United States Patent
Geldbach et al.

(10) Patent No.: US 8,891,749 B2
(45) Date of Patent: Nov. 18, 2014

(54) SYSTEM AND METHOD FOR PROVIDING EMERGENCY WIRELINE TELEPHONE SERVICES TO RESIDENCES

(75) Inventors: Erik Geldbach, Olathe, KS (US); Kelsyn Donel Seven Rooks, Sr., Overland Park, KS (US); Mark Wilmoth, Gardner, KS (US); Shane M. Smith, Paola, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 1101 days.

(21) Appl. No.: 12/070,909

(22) Filed: Feb. 21, 2008

(65) Prior Publication Data

US 2009/0214011 A1 Aug. 27, 2009

(51) Int. Cl.
 *H04M 3/42* (2006.01)
 *H04M 15/00* (2006.01)
 *H04M 7/00* (2006.01)

(52) U.S. Cl.
 CPC .......... *H04M 15/00* (2013.01); *H04M 2242/04* (2013.01); *H04M 15/82* (2013.01); *H04M 7/0057* (2013.01); *H04M 2215/78* (2013.01)
 USPC ............... 379/201.12; 379/88.22; 379/114.01

(58) Field of Classification Search
 USPC ................ 379/111, 114.01, 352, 67.1, 88.22, 379/107.05, 201.01, 201.12; 455/404.1
 See application file for complete search history.

(56) References Cited

U.S. PATENT DOCUMENTS

| | | | |
|---|---|---|---|
| 5,339,351 A | 8/1994 | Hoskinson et al. | |
| 5,379,337 A | 1/1995 | Castillo et al. | |
| 5,497,149 A | 3/1996 | Fast | |
| 5,555,286 A | 9/1996 | Tendler | |
| 5,646,987 A | 7/1997 | Gerber et al. | |
| 5,937,038 A | 8/1999 | Bell et al. | |
| 6,137,877 A * | 10/2000 | Robin et al. | 379/352 |
| 6,240,285 B1 | 5/2001 | Blum et al. | |
| 6,317,049 B1 | 11/2001 | Toubia et al. | |
| 6,366,772 B1 | 4/2002 | Arnson | |
| 6,415,018 B1 | 7/2002 | Antonucci et al. | |
| 6,480,578 B1 | 11/2002 | Allport | |
| 6,526,125 B1 | 2/2003 | Lindsay et al. | |
| 6,591,112 B1 | 7/2003 | Siccardo et al. | |
| 6,642,844 B2 | 11/2003 | Montague | |
| 6,678,357 B2 | 1/2004 | Stumer et al. | |
| 6,690,932 B1 | 2/2004 | Barnier et al. | |
| 6,771,163 B2 | 8/2004 | Linnett et al. | |
| 6,839,022 B1 | 1/2005 | Benco et al. | |
| 7,026,925 B2 | 4/2006 | Roche et al. | |
| 7,079,627 B2 | 7/2006 | Crago et al. | |
| 7,095,733 B1 | 8/2006 | Yarlagadda et al. | |
| 7,098,787 B2 | 8/2006 | Miller | |

(Continued)

OTHER PUBLICATIONS

Non-Final Rejection mailed Jan. 19, 2011 for U.S. Appl. No. 11/430,232.

(Continued)

*Primary Examiner* — Md S Elahee
(74) *Attorney, Agent, or Firm* — Swanson & Bratschun, L.L.C.

(57) ABSTRACT

A system and method for providing wireline telephone services may include providing wireline telephone services to a residence to enable a user to place telephone calls. In response to receiving an access code, the user may be enabled to place telephone calls. The user may be billed for placing the telephone calls on a per-usage basis.

16 Claims, 6 Drawing Sheets

(56) References Cited

U.S. PATENT DOCUMENTS

| | | | |
|---|---|---|---|
| 7,231,218 B2 | 6/2007 | Diacakis et al. | |
| 7,269,413 B2 | 9/2007 | Kraft | |
| 7,342,917 B2 | 3/2008 | Mohan et al. | |
| 7,386,103 B1 | 6/2008 | Chahal | |
| 7,418,087 B2 | 8/2008 | Luneau et al. | |
| 7,496,189 B2 | 2/2009 | Clarisse et al. | |
| 7,574,194 B2 | 8/2009 | Yang et al. | |
| 7,679,505 B1 | 3/2010 | Vallaire | |
| 7,706,356 B1 | 4/2010 | Olshansky et al. | |
| 7,734,019 B1 | 6/2010 | Terpstra | |
| 7,773,975 B2 | 8/2010 | Snapp et al. | |
| 7,920,679 B1 | 4/2011 | Naim et al. | |
| 7,991,135 B2 * | 8/2011 | Rauba et al. | 379/201.12 |
| 8,014,341 B1 | 9/2011 | Ray | |
| 8,102,986 B1 | 1/2012 | McClintock et al. | |
| 8,295,801 B2 | 10/2012 | Ray et al. | |
| 8,320,871 B2 | 11/2012 | Ray et al. | |
| 8,364,113 B2 | 1/2013 | Ray et al. | |
| 8,447,267 B2 | 5/2013 | Ray et al. | |
| 8,615,214 B2 | 12/2013 | Jain et al. | |
| 8,630,609 B2 | 1/2014 | Ray et al. | |
| 8,712,366 B2 | 4/2014 | Greene et al. | |
| 8,718,595 B2 | 5/2014 | Ray et al. | |
| 2001/0003843 A1 | 6/2001 | Scepanovic et al. | |
| 2001/0004588 A1 | 6/2001 | Hong | |
| 2001/0012379 A1 | 8/2001 | Amemiya et al. | |
| 2002/0012323 A1 | 1/2002 | Petite et al. | |
| 2002/0016189 A1 | 2/2002 | Sheynblat et al. | |
| 2002/0054667 A1 | 5/2002 | Martinez | |
| 2002/0136363 A1 | 9/2002 | Stumer et al. | |
| 2003/0012344 A1 | 1/2003 | Agarwal et al. | |
| 2003/0063714 A1 | 4/2003 | Stumer et al. | |
| 2003/0109245 A1 | 6/2003 | McCalmont et al. | |
| 2003/0133450 A1 | 7/2003 | Baum | |
| 2003/0158668 A1 | 8/2003 | Anderson | |
| 2004/0072583 A1 | 4/2004 | Weng | |
| 2004/0077347 A1 | 4/2004 | Lauber et al. | |
| 2004/0090950 A1 | 5/2004 | Lauber et al. | |
| 2004/0176123 A1 | 9/2004 | Chin et al. | |
| 2004/0257273 A1 | 12/2004 | Benco et al. | |
| 2005/0002499 A1 | 1/2005 | Ordille et al. | |
| 2005/0003797 A1 | 1/2005 | Baldwin | |
| 2005/0070315 A1 | 3/2005 | Rai et al. | |
| 2005/0101287 A1 | 5/2005 | Jin et al. | |
| 2005/0111630 A1 | 5/2005 | Potomy et al. | |
| 2005/0123102 A1 | 6/2005 | Beason et al. | |
| 2005/0151642 A1 | 7/2005 | Tupler et al. | |
| 2005/0159132 A1 | 7/2005 | Wright et al. | |
| 2005/0169248 A1 | 8/2005 | Truesdale et al. | |
| 2005/0197096 A1 | 9/2005 | Yang et al. | |
| 2005/0201358 A1 | 9/2005 | Nelson et al. | |
| 2005/0209781 A1 | 9/2005 | Anderson | |
| 2005/0232225 A1 | 10/2005 | Pelaez et al. | |
| 2006/0009190 A1 * | 1/2006 | Laliberte | 455/404.1 |
| 2006/0043164 A1 | 3/2006 | Dowling et al. | |
| 2006/0052134 A1 | 3/2006 | Sato | |
| 2006/0072547 A1 | 4/2006 | Florkey et al. | |
| 2006/0133582 A1 | 6/2006 | McCulloch | |
| 2006/0217136 A1 | 9/2006 | Bantukul et al. | |
| 2006/0219542 A1 | 10/2006 | Savir | |
| 2006/0234726 A1 | 10/2006 | Ashley et al. | |
| 2006/0234727 A1 | 10/2006 | Ashley et al. | |
| 2006/0293024 A1 | 12/2006 | Benco et al. | |
| 2007/0003024 A1 | 1/2007 | Olivier et al. | |
| 2007/0064882 A1 | 3/2007 | Ger et al. | |
| 2007/0121851 A1 * | 5/2007 | Maropis et al. | 379/127.05 |
| 2007/0201391 A1 | 8/2007 | Belmonte et al. | |
| 2007/0273519 A1 | 11/2007 | Ichikawa et al. | |
| 2007/0280428 A1 | 12/2007 | McClelland | |
| 2007/0287473 A1 | 12/2007 | Dupray | |
| 2008/0018452 A1 | 1/2008 | McCarthy et al. | |
| 2008/0026728 A1 | 1/2008 | Snapp et al. | |
| 2008/0057944 A1 | 3/2008 | Miriyala et al. | |
| 2008/0064363 A1 | 3/2008 | Salafia et al. | |
| 2008/0064375 A1 * | 3/2008 | Gottlieb | 455/414.1 |
| 2008/0070546 A1 | 3/2008 | Lee | |
| 2008/0144779 A1 | 6/2008 | Ray et al. | |
| 2008/0200143 A1 | 8/2008 | Qiu et al. | |
| 2008/0261557 A1 | 10/2008 | Sim | |
| 2008/0273670 A1 | 11/2008 | Dickinson | |
| 2008/0304630 A1 | 12/2008 | Nguyen et al. | |
| 2009/0047924 A1 | 2/2009 | Ray et al. | |
| 2009/0086932 A1 | 4/2009 | Ray | |
| 2009/0097474 A1 | 4/2009 | Ray et al. | |
| 2009/0144260 A1 | 6/2009 | Bennett et al. | |
| 2009/0186596 A1 | 7/2009 | Kaltsukis | |
| 2009/0197567 A1 | 8/2009 | Ogram | |
| 2009/0227225 A1 | 9/2009 | Mitchell et al. | |
| 2009/0305730 A1 | 12/2009 | Herz et al. | |
| 2009/0310602 A1 | 12/2009 | Olshansky et al. | |
| 2010/0002845 A1 | 1/2010 | Zerillo et al. | |
| 2010/0002846 A1 | 1/2010 | Ray et al. | |
| 2010/0003946 A1 | 1/2010 | Ray et al. | |
| 2010/0003947 A1 | 1/2010 | Ray et al. | |
| 2010/0003949 A1 | 1/2010 | Ray et al. | |
| 2010/0003954 A1 | 1/2010 | Ray et al. | |
| 2010/0003955 A1 | 1/2010 | Ray et al. | |
| 2010/0003961 A1 | 1/2010 | Ray et al. | |
| 2010/0098062 A1 | 4/2010 | Croak et al. | |
| 2010/0107192 A1 | 4/2010 | Sennett et al. | |
| 2010/0142386 A1 | 6/2010 | Snapp et al. | |
| 2010/0215153 A1 | 8/2010 | Ray et al. | |
| 2010/0291894 A1 | 11/2010 | Pipes | |
| 2011/0014923 A1 | 1/2011 | Krco et al. | |
| 2011/0096769 A1 | 4/2011 | Sim | |
| 2012/0214437 A1 | 8/2012 | Ray et al. | |
| 2012/0309340 A1 | 12/2012 | Ray | |
| 2013/0012156 A1 | 1/2013 | Ray et al. | |
| 2013/0059560 A1 | 3/2013 | Ray et al. | |
| 2013/0102269 A1 | 4/2013 | Ray et al. | |
| 2013/0217355 A1 | 8/2013 | Ray et al. | |
| 2013/0237181 A1 | 9/2013 | Ray | |

OTHER PUBLICATIONS

Non-Final Rejection mailed Mar. 17, 2011 for U.S. Appl. No. 11/640,714.
RCE filed on Apr. 4, 2011 for U.S. Appl. No. 11/891,784.
Final Rejection mailed Jan. 3, 2011 for U.S. Appl. No. 11/891,784.
Non-Final Rejection mailed Mar. 4, 2011 for U.S. Appl. No. 12/257,424.
"NENA Recommended Generic Standards for E9-1-1 PSAP Equipment" NENA Technical Reference. NENA-04-001 Issue 2, Mar. 2001.
Non-Final Rejection mailed Mar. 28, 2011 for U.S. Appl. No. 12/272,238.
Non-Final Rejection mailed Apr. 1, 2011 for U.S. Appl. No. 12/257,655.
Non-Final Rejection mailed Mar. 3, 2011 for U.S. Appl. No. 12/257,416.
Non-Final Rejection mailed Mar. 17, 2011 for U.S. Appl. No. 12/257,640.
Dale N. Hatfield, "A Report on Technical and Operational Issues Impacting the Provision of Wireless Enhanced 911 Services," Federal Communications Commission, printed from the World Wide Web on May 8, 2006 (54 pages).
Ansi, "TIA Standard Telecommunications Telephone Terminal Equipment Caller Identity and Visual Message Waiting Indicator Equipment Performance Requirements," TIA-777-A, Revision of TIA/EIA-777, May 1, 2003 (77 pages).
Micro Engineering Labs, Inc., "Caller ID", Retrieved from the Internet at URL: <http://www.melabs.com/resources/callerid.htm> on Apr. 24, 2006; Copyright 2006 by microEngineering Labs, Inc, (as of date of retrieval, article last updated Apr. 16, 2006) (3 pages).
Dave Ryan & Asher Hazanchuk, "On-Hook & Off-Hook Caller ID Using DSP," Circuit Cellular INK # 83, Jun. 1997 (12 pages).
Ittiam Systems, "Caller Identification (CLI or Caller ID)," Retrieved from the Internet on Apr. 24, 2006 at URL <http://www.ittiam.com/pages/products/cid.htm, downloaded from the World Wide Web on Apr. 24, 2006 (2 pages).
Response filed Nov. 2, 2010 for U.S. Appl. No. 11/891,784.

(56) References Cited

OTHER PUBLICATIONS

"AT & T Wireless Unleashes the First and Only Wireless Messaging Device", PhysOrg.com, Sep. 30, 2004; available online at URL: <http://www.physorg.com/news1392.html> (12 pages).

Non-Final Office Action date mailed Aug. 3, 2010 for U.S. Appl. No. 11/891,784.

U.S. Appl. No. 12/257,624; Non-Final Rejection dated Oct. 16, 2013; 38 pages.

U.S. Appl. No. 12/391,503; Non Final Office Action dated Oct. 25, 2013; 23 pages.

U.S. Appl. No. 12/257,928; Non-Final Rejection dated Nov. 20, 2013; 35 pages.

U.S. Appl. No. 12/257,424; Final Rejection dated Nov. 21, 2013; 34 pages.

U.S. Appl. No. 12/257,862; Notice of Allowance dated Dec. 6, 2013; 21 pages.

U.S. Appl. No. 13/847,388; Non-Final Office Action dated Dec. 9, 2013; 34 pages.

U.S. Appl. No. 13/460,507; Notice of Allowance dated Dec. 20, 2013; 20 pages.

U.S. Appl. No. 13/715,808; Issue Notification dated Dec. 24, 2013; 1 page.

Federal Standard 1037C: Telecommunications: Glossary of Telecommunication Terms. National Communication System. Technology and Standards Division. Washington, DC; General Services Administration, Information Technology Service, 1996. pp. vii, A-28, H-7, O.

U.S. Appl. No. 12/391,503; Non Final Office Action dated Feb. 16, 2012; 9 pages.

U.S. Appl. No. 12/391,503; Final Rejection dated May 24, 2012; 19 pages.

U.S. Appl. No. 11/891,784; Notice of Allowance dated Jul. 18, 2012; 27 pages.

U.S. Appl. No. 11/974,775; Notice of Allowance dated Jun. 12, 2012; 15 pages.

U.S. Appl. No. 12/168,668; Final Rejection dated Jul. 11, 2012; 29 pages.

U.S. Appl. No. 12/257,424; Final Rejection dated Jun. 13, 2012; 41 pages.

U.S. Appl. No. 12/257,641; Notice of Allowance dated Aug. 2, 2012; 17 pages.

U.S. Appl. No. 12/272,238; Notice of Allowance dated Jun. 8, 2012; 21 pages.

U.S. Appl. No. 12/257,424; Non-Final Rejection dated Jul. 8, 2013; 46 pages.

U.S. Appl. No. 12/257,862; Non-Final Rejection dated Aug. 23, 2013; 29 pages.

U.S. Appl. No. 13/715,808; Notice of Allowance dated Sep. 13, 2013; 27 pages.

U.S. Appl. No. 13/847,388; Non-Final Office Action dated Jul. 17, 2013; 54 pages.

U.S. Appl. No. 11/891,784; Issue Notification dated Sep. 26, 2012; 1 page.

U.S. Appl. No. 11/904,883; Non Final Rejection dated Oct. 11, 2012; 26 pages.

U.S. Appl. No. 11/974,775; Corrected Notice of Allowability dated Aug. 31, 2012; 7 pages.

U.S. Appl. No. 11/974,775; Issue Notification dated Sep. 26, 2012; 1 page.

U.S. Appl. No. 12/257,574; Notice of Allowance dated Sep. 14, 2012; 25 pages.

U.S. Appl. No. 12/272,238; Issue Notification dated Oct. 3, 2012; 1 page.

U.S. Appl. No. 13/460,507; Non-Final Rejection dated Aug. 16, 2012; 28 pages.

U.S. Appl. No. 11/904,883; Non Final Rejection dated Apr. 19, 2013; 22 pages.

U.S. Appl. No. 12/257,862; Non-Final Rejection dated Mar. 13, 2013; 30 pages.

U.S. Appl. No. 13/460,507; Non-Final Rejection dated Apr. 26, 2013; 19 pages.

U.S. Appl. No. 13/614,585; Issue Notification dated May 1, 2013; 1 page.

U.S. Appl. No. 13/715,808; Non-Final Rejection dated Apr. 9, 2013; 36 pages.

U.S. Appl. No. 11/904,883; Non Final Rejection dated Feb. 5, 2014; 19 pages.

U.S. Appl. No. 12/257,424; Non-Final Rejection dated Apr. 17, 2014; 39 pages.

U.S. Appl. No. 12/257,862; Issue Notification dated Apr. 9, 2014; 1 page.

U.S. Appl. No. 12/257,928; Notice of Allowance dated Mar. 6, 2014; 20 pages.

U.S. Appl. No. 13/460,507; Issue Notification dated Apr. 16, 2014; 1 page.

U.S. Appl. No. 13/612,558; Non-Final Rejection dated Apr. 11, 2014; 37 pages.

U.S. Appl. No. 13/847,388; Final Rejection dated Apr. 7, 2014; 36 pages.

U.S. Appl. No. 12/257,574; Issue Notification dated Jan. 9, 2013; 1 page.

U.S. Appl. No. 13/150,725; Non-Final Rejection dated Nov. 26, 2012; 19 pages.

U.S. Appl. No. 13/460,507; Final Rejection dated Dec. 20, 2012; 14 pages.

U.S. Appl. No. 13/614,585; Notice of Allowance dated Dec. 11, 2012; 30 pages.

U.S. Appl. No. 11/430,232; Notice of Allowance dated May 13, 2011; 12 pages.

U.S. Appl. No. 11/430,232; Issue Notification dated Aug. 17, 2011; 1 page.

U.S. Appl. No. 11/640,714; Non-Final Rejection dated Sep. 15, 2011; 15 pages.

U.S. Appl. No. 11/640,714; Final Rejection dated Feb. 29, 2012; 17 pages.

U.S. Appl. No. 11/904,883; Non-Final Rejection dated Oct. 7, 2011; 19 pages.

U.S. Appl. No. 11/904,883; Final Rejection dated Apr. 27, 2012; 16 pages.

U.S. Appl. No. 12/257,424; Non-Final Rejection dated Jan. 31, 2012; 21 pages.

U.S. Appl. No. 12/257,424; Request for Continued Examination and Amendment dated Oct. 14, 2011; 8 pages.

U.S. Appl. No. 12/257,424; Final Rejection dated Jul. 14, 2011; 19 pages.

U.S. Appl. No. 11/974,775; Notice of Allowance dated Apr. 27, 2012; 12 pages.

U.S. Appl. No. 11/974,775; Non-Final Rejection dated Nov. 7, 2011; 19 pages.

U.S. Appl. No. 11/974,775; Non-Final Rejection dated May 10, 2011; 24 pages.

U.S. Appl. No. 12/168,668; Non-Final Rejection dated Feb. 6, 2012; 21 pages.

U.S. Appl. No. 12/257,574; Request for Continued Examination and Amendment dated Mar. 29, 2012; 7 pages.

U.S. Appl. No. 12/257,574; Final Rejection dated Dec. 29, 2011; 18 pages.

US Appl. No. 12/257,574; Non-Final Rejection dated Jul. 6, 2011; 20 pages.

U.S. Appl. No. 12/257,624; Request for Continued Examination and Amendment dated Apr. 30, 2012; 8 page.

U.S. Appl. No. 12/257,624; Final Rejection dated Jan. 31, 2012; 14 pages.

U.S. Appl. No. 12/257,624; Non-Final Rejection dated Oct. 6, 2011; 19 pages.

U.S. Appl. No. 12/257,641; Request for Continued Examination dated Apr. 30, 2012; 2 pages.

U.S. Appl. No. 12/257,641; Notice of Allowance dated Feb. 2, 2012; 12 pages.

U.S. Appl. No. 12/257,641; Non-Final Rejection dated May 24, 2011; 17 pages.

(56) References Cited

OTHER PUBLICATIONS

U.S. Appl. No. 12/257,928; Request for Continued Examination and Amendment dated Feb. 22, 2012; 12 pages.
U.S. Appl. No. 12/257,928; Non-Final Rejection dated Jun. 8, 2011; 21 pages.
U.S. Appl. No. 12/257,862; Request for Continued Examination and Amendment dated Feb. 29, 2012; 9 pages.
U.S. Appl. No. 12/257,862; Final Rejection dated Nov. 30, 2011; 15 pages.
U.S. Appl. No. 12/257,862; Non-Final Rejection dated May 24, 2011; 19 pages.
U.S. Appl. No. 12/272,238; Pre-Brief Appeal Conference Decision dated Jan. 17, 2012; 2 pages.
U.S. Appl. No. 12/272,238; Notice of Appeal and Pre-Brief Conference Request dated Dec. 28, 2011; 6 pages.
U.S. Appl. No. 12/272,238; Final Rejection dated Sep. 29, 2011; 12 pages.
U.S. Appl. No. 12/272,238; Non-Final Rejection dated Mar. 28, 2011; 14 pages.
U.S. Appl. No. 12/257,641; Issue Notification dated Nov. 7, 2012; 1 page.
U.S. Appl. No. 11/640,714; Non-Final Rejection dated May 29, 2014; 50 pages.
U.S. Appl. No. 11/904,883; Non Final Rejection dated Jun. 10, 2014; 15 pages.
U.S. Appl. No. 12/257,424; Notice of Allowance dated Aug. 11, 2014; 36 pages.
U.S. Appl. No. 12/257,624; Final Office Action dated May 13, 2014; 28 pages.
U.S. Appl. No. 12/257,928; Issue Notification dated Jun. 25, 2014; 1 page.
U.S. Appl. No. 12/391,503; Final Rejection dated Jun. 5, 2014; 39 pages.
U.S. Appl. No. 13/847,388; Non-Final Rejection dated Jul. 17, 2014; 39 pages.
U.S. Appl. No. 13/848,649; Non-Final Rejection dated Jul. 17, 2014; 21 pages.
U.S. Appl. No. 13/612,558; Notice of Allowance dated Sep. 16, 2014; 16 pages.
U.S. Appl. No. 11/904,883; Notice of Allowance dated Oct. 8, 2014; 17 pages.
U.S. Appl. No. 12/168,668; Notice of Allowance dated Oct. 7, 2014; 31 pages.

\* cited by examiner

SYSTEM AND METHOD FOR PROVIDING EMERGENCY WIRELINE TELEPHONE SERVICES TO RESIDENCES

BACKGROUND

Traditional wireline telephone services (i.e., telephones connected to the public switched telephone network (PSTN)) have been and are, in most cases, still provided by local telecommunications service providers. As alternative telecommunications services have become more prevalent in recent years, consumers have opted to switch to the alternative telecommunication services as their primary telecommunication services and, in many cases, drop or simply do not install wireline telephone services at their residences. Alternative telecommunication services include mobile telephone services and voice over internet protocol (VoIP) telephone services, for example.

While these alternative telecommunication services suffice to provide reliable communications for users, one problem that occurs for alternative telecommunication services is power outages. Power outages mostly occur (i) in the western part of the United States during "blackouts" and "rolling brown outs" when energy supply is low and demand is high, and (ii) in the southeastern United States from hurricane damage. Other weather and non-weather events, such as floods, tornadoes, thunderstorms, and emergency situations, can cause power outages. As understood, the PSTN or wireline telephone services may enable wireline telephones to operate during power outages.

Unlike wireline telecommunications services, power outages affect alternative telecommunications by causing the telephones (e.g., mobile telephones, handsets and computers operating soft phones) to be limited to battery power. In the event that a power outage lasts for even a few hours, most devices of alternative telecommunications services run out of battery power, thereby leaving users without telephone services.

While users who opt for alternative telecommunications services may face challenges in the event of power outages, local telecommunications service providers that lose customers due to customers choosing alternative telecommunications services also lose the ability to market products and services to those customers and residences after a certain period of time (i.e., "win back" period of time), as provided by laws and regulations of the Federal Communications Commission (FCC). Furthermore, after a customer cancels wireline telephone service, the local telecommunications service provider typically physically disables the wireline telephone line to reduce overhead and expenses for maintenance. In some cases, "warm lines" are maintained at residences and paid by the service provider in hopes of the former or new customer at the residence wanting to turn wireline telephone service back on. However, warm line telephone service is not cost effective for the local telecommunications service provider, so is typically not a viable option. For at least the foregoing reasons, the local telecommunications service providers desire maintaining wireline telecommunications services to residences.

SUMMARY

To overcome the problems of customers canceling or not activating wireline telephone services, thereby causing users to lose telephone service during power outages when battery power stops and local telecommunications service providers to lose the ability to market to customers at their residences, the principles of the present invention provide for local telecommunications service providers to offer "emergency" wireline telephone services to customers at residences. The emergency wireline telephone services allow customers to have access to reliable telephone services in the event of a power outage and local telecommunications service providers to continue marketing to the customers. The emergency telephone services may be offered by maintaining wireline telephone services to a residence and allowing customers to other parties after entering an access code prior to dialing and 911 and an operator without having to enter an access code. In one embodiment, the customers may be billed strictly on a per-usage basis. Alternatively, the customer may be billed a minimal amount to maintain the phone service in addition to the per-usage basis. By having the customer dial an access code prior to dialing other parties, access to the emergency wireline telephone service may be limited by the subscriber, so that children and guests do not cause a subscriber's bill to be unexpectedly high, as each call may cost a premium (e.g., $0.99 or more).

One embodiment of a process for providing wireline telephone services may include providing wireline telephone services to a residence to enable a user to place telephone calls. In response to receiving an access code, the user may be enabled to place telephone calls. The user may be billed for placing the telephone calls on a per-usage basis.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE DRAWINGS

Figure 1:
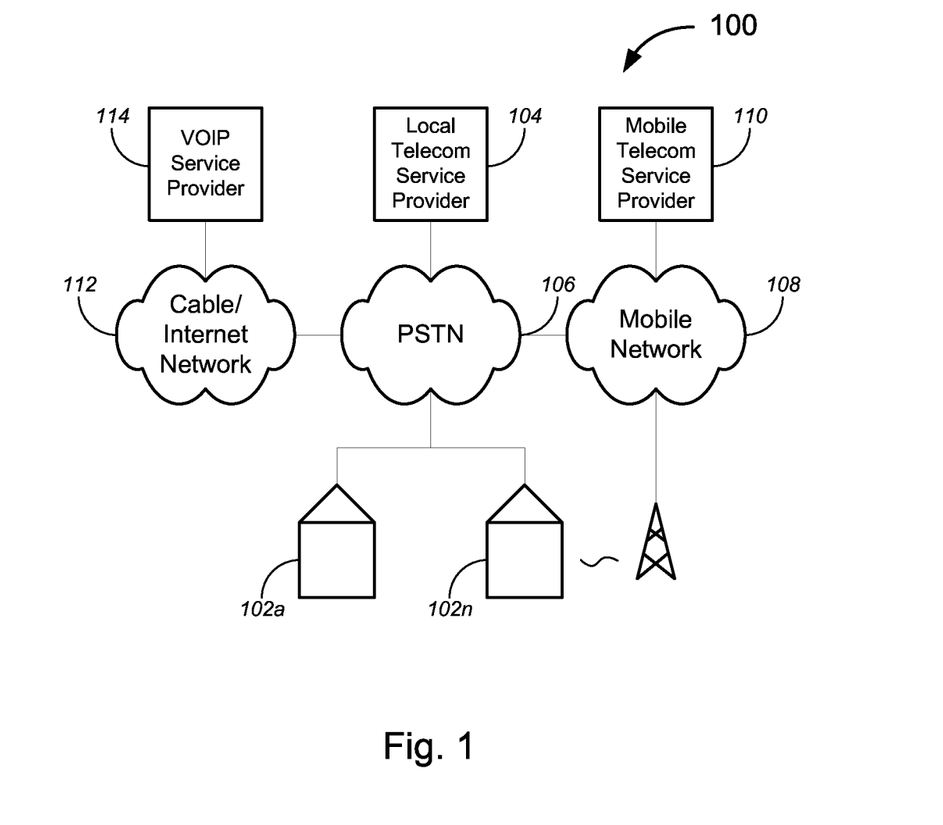
FIG. 1 is an illustration of an exemplary telephone communications system that enables consumers to receive telecommunications services.

Referring to FIG. 1, telecommunications services 100 may be provided to consumers at residences 102*a*-102*n* (collectively 102) in a variety of ways. As shown, a local telecommunications services provider 104 may provide local telecommunications services via the PSTN 106 to the residences 102. In providing the local telecommunications services, the residences receive wireline telephone services, whereby the PSTN 106 provides power to telephones at the residences 102. As understood in the art, telephones without answering machines that connect to the PSTN 106 operate on power delivered by the PSTN 106, which enables the wireline telephones to remain active during a power outage.

In addition to wireline telephone services, the residences 102 may also have telecommunications access to one or more mobile telephone networks 108 that are operated by mobile telephone service providers 110 and cable/internet networks 112 over which VoIP service providers 114 provide telecommunications services. Because consumers at the residences 102 have these different telecommunications services options, the consumers tend to select a telecommunications service that is both cost effective and convenient. Because mobile telephones and VoIP telephones have become commonplace and well understood to be cost effective and convenient for both home and out-of-home usage, consumers at residences have in many cases departed from traditional home wireline telephone services. In accordance with the principles of the present invention, wireline telephone services may be provided to residences 102 by providing no or low monthly service fee and premium fees on a per-usage basis.

Figure 2:
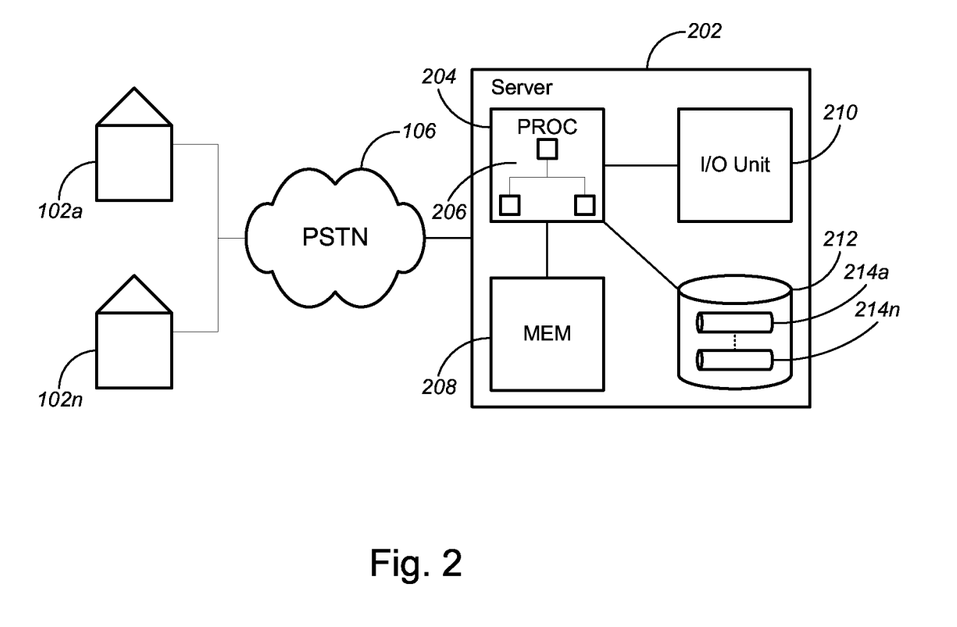
FIG. 2 is an illustration of an exemplary server operating on the PSTN to provide emergency telephone services in accordance with the principles of the present invention.

Referring to FIG. 2, a server 202 operating on the PSTN 106 may be in communication with wireline telephones operating in the residences 102. The server 202 may be operated by a local telecommunications service provider to manage information associated with customers of the local telecommunications service provider at the residences 102 and process telephone calls being placed thereby. The server 202 may include a processing unit 204 that executes software 206. The processing unit 204 may be in communication with memory 208, I/O unit 210, and storage unit 212. The storage unit may store data repositories 214a-214n (collectively 214). In one embodiment, the data repositories 214 are databases, such as relational databases, that are configured to store a telephone number pool and billing information associated with customers of the local telecommunications service provider. The telephone number pool may include telephone numbers or directory numbers (DNs) that can be temporarily issued to customers who have an emergency wireline telephone service plan, as further described herein. Although shown as a single server 202 with a single processing unit 204, it should be understood that multiple servers and processing units, which may include one or more computer processors, may operate in conjunction to perform one or more functions in accordance with the principles of the present invention.

In operation, the server 202 may monitor calls being placed by users at the residences 102. In response to receiving a calling request being placed by a user at one of the residences, the processing unit 204 may receive notification that a call is being placed and assign a telephone number from the telephone number pool stored in one of the repositories 214. In addition, the processing unit 204 may determine that an access code has been entered by the user and authorize the user to place a call via the PSTN 106 in response to determining that the access code is valid. Because the telephone line is an emergency telephone line, the user may place a telephone call to a public safety answering point (PSAP) using a "911" telephone number or call an operator for information. However, to place a telephone call to another user on the PSTN 106 or other telecommunications network, the user, in one embodiment, is to dial an access code (e.g., "*0714") prior to dialing the telephone number. The access code may be established by the telecommunications service provider or by the user to restrict access to the wireline telephone line so as to limit unauthorized callers to place calls from the wireline telephone line. The access code may be established by a user using an interactive voice response (IVR) system, interactive response system, call to an operator at the local telephone service provider, interactive website, or any other means for establishing an access code.

The telephone number pool, or DN pool, may be used to establish a telephone number for a caller rather than maintaining a telephone number for the wireline telephone service so as to minimize the number of telephone numbers that are reserved by the local telecommunications service provider. It should be understood that an emergency telephone call being placed by a user at a residence with emergency telephone service may have a physical address communicated to an operator at a PSAP as the circuit, and not the telephone number, is used to look up the physical address of the caller. Should the user place an emergency telephone call, the server 202 may maintain the temporary telephone number with the wireline telephone line for a certain period of time (e.g., 24 hours) in case a call to that telephone line is to be made by authorities. In one embodiment, should a user desire to maintain his or her telephone number, rather than allowing the telephone number to be assigned "on-the-fly," then the user may pay an extra fee (e.g., $2.00 per month) to the local telecommunications service provider.

Figure 3:
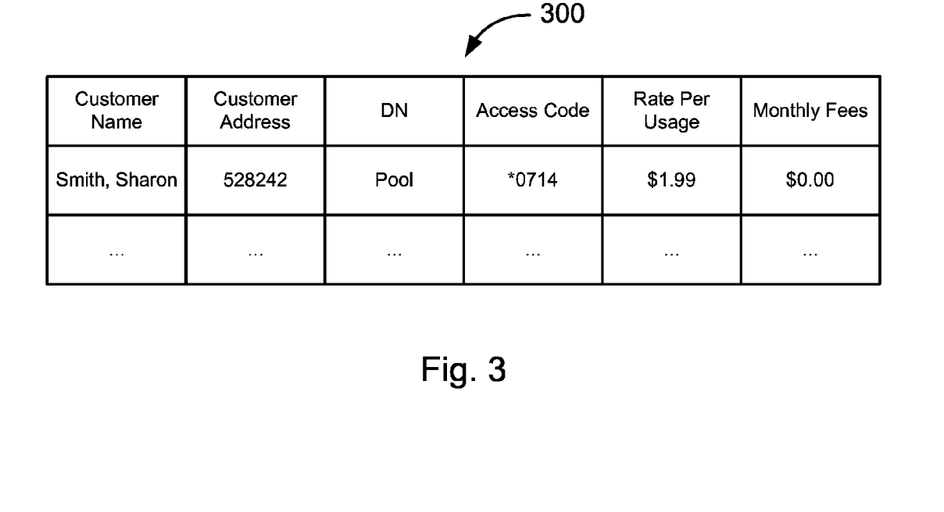
FIG. 3 is a depiction of an exemplary table for enabling emergency telecommunications services.

Referring to FIG. 3, a table 300 being managed by a server, such as server 202 of FIG. 2, may be used to store customer information, including name, address, identification (ID), DN, access code, rate per usage, monthly fees, and so forth. The customer ID may be an account number or otherwise. A DN associated with the customer may be a telephone number or an indicator (e.g., "pool") or other indicia that the telephone number of the customer is to be accessed within a pool in response to receiving a notification that a user is attempting to place a telephone call via a telephone in a residence in which the subscriber has requested to be on an emergency wireline telephone service plan. The access code may be an "*" followed by a code, such as a 4-digit code. As previously described, the access code may be established by the local telecommunications service provider or a subscriber. A rate-per-usage may be set at a fixed or variable rate. For example, a fixed rate may be $1.99 per call, whereas a variable rate may include a fixed portion and a variable portion based on time of day, length of call, day of week, distance of call, or any other variable. It should be understood that because the customer is operating on a per-usage fee structure, that the fees for placing a call may be at a premium to offset the fact that the customer is paying no or minimal costs for maintaining the wireline telephone service. The monthly fees may be $0 per month, or a minimal amount, such as $5.00, to entice the customer to maintain wireline telephone services at his or her residence. In return, by maintaining the wireline telephone services, the local telecommunications service provider may be able to send advertisements or otherwise solicit the customer for additional services. An analogy of the emergency wireline telephone service plan is a pay phone in the home, as the user may simply pay for each use of the wireline telephone.

Figure 4:
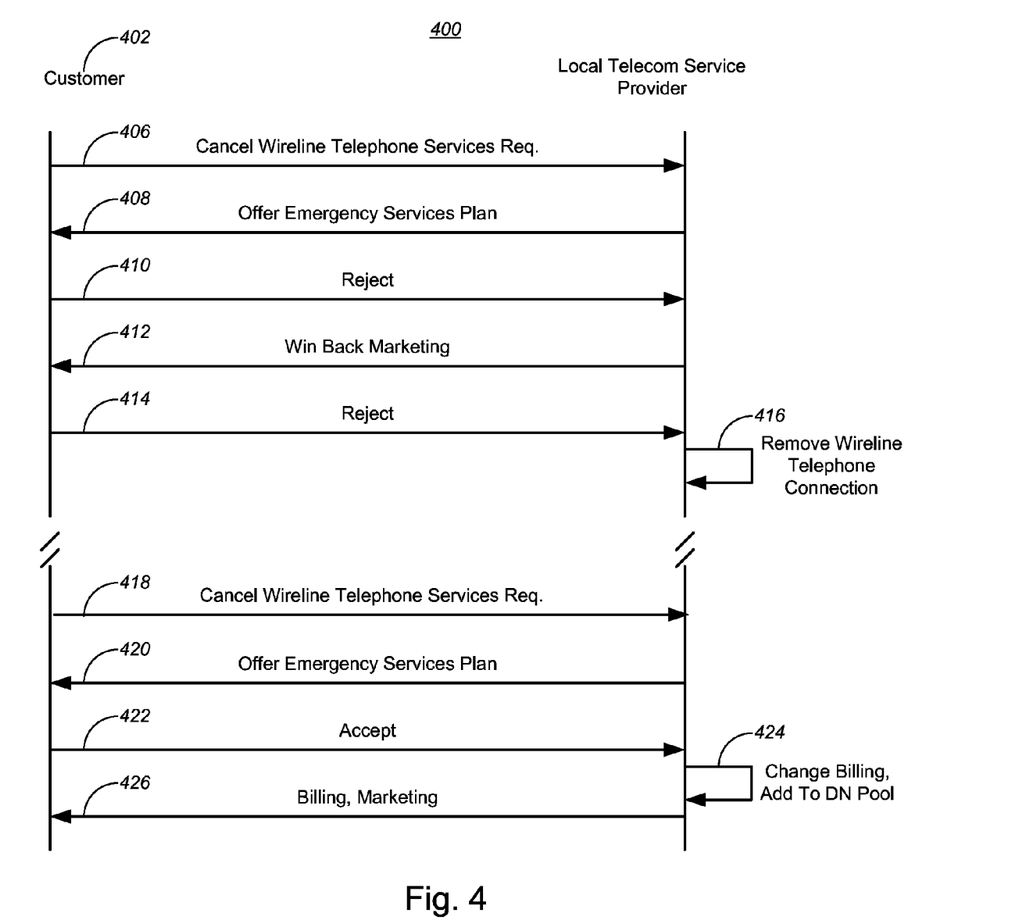
FIG. 4 is an illustration of an exemplary timing diagram for enabling a local telecommunications service provider to provide a customer with emergency telecommunications services.

Referring to FIG. 4, a timing diagram 400 shows a customer 402 of a local telecommunication servers provider 404 cancelling wireline services at step 406. At step 408, the local telecommunication service provider 404 may offer an emergency service plan at step 408. At step 410, the customer 402 may reject the emergency service plan by the local telecommunication service provider 404. After rejection, as regulated by the FCC, the local telecommunication service provider 404 may communicate "win back" marketing to entice the customer 402 to maintain or reactivate his or her services. The win back marketing may be performed by the local telecommunication service provider for a limited period of time, such as six months. Should the customer 402 continue to reject the local telecommunication service provider 404 at step 414, then at step 416, the local telecommunication service provider 404 may remove wireline telephone services from the customer's premises so as to minimize costs and expenses for maintaining the wireline services and physical connection.

In an alternative scenario, if the customer 402 cancels wireline telephone services at step 418, then the local telecommunication service provider 404 may offer the emergency wireline telephone services at step 420. Should the customer 402 accept the emergency wireline telephone services offer at step 422, then the local telecommunication service provider 404 may change billing and add the customer information to cause a telephone number to be provided to the customer 402 when placing a call using the emergency telephone services. At step 426, the customer 402 may be billed in accordance with the emergency telephone services and marketing may continue by the local telecommunication service provider 404 to the customer 402. Although described as a local telecommunication service provider, it should be understood that wireline telephone services may be provided by a non-local telecommunication service provider.

Figure 5:
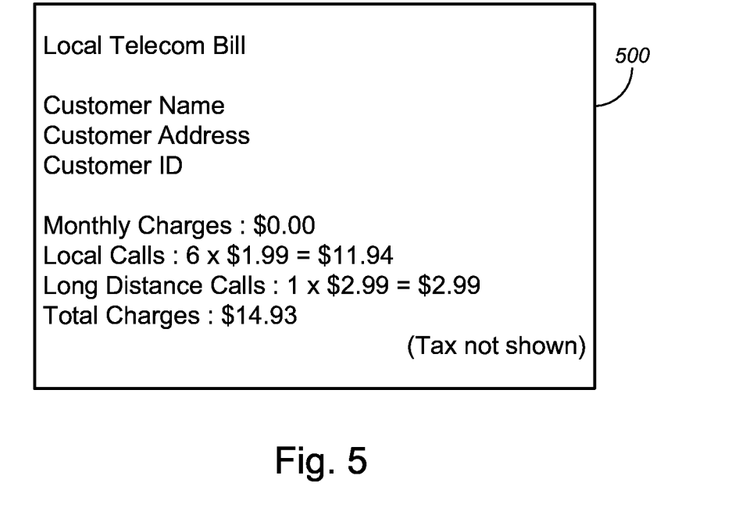
FIG. 5 is an illustration of an exemplary bill from a local telecommunications service provider to a customer for receiving emergency telecommunications services.

Referring to FIG. 5, an exemplary bill 500 may be issued to a customer for use of wireline telephone service under an emergency wireline telephone service plan. As shown, the monthly charges are $0.00, and local calls are $1.99. In addition, long distance calls may be charged at $2.99. It should be understood that the rate for each of the different types of calls are exemplary and that other prices and fee structures may be utilized in accordance with the principles of the present invention. However, because the customer is operating under an emergency telephone service plan, monthly service fees may be waived or minimal service fees may be applied and the customer is billed on a per-usage basis.

Figure 6:
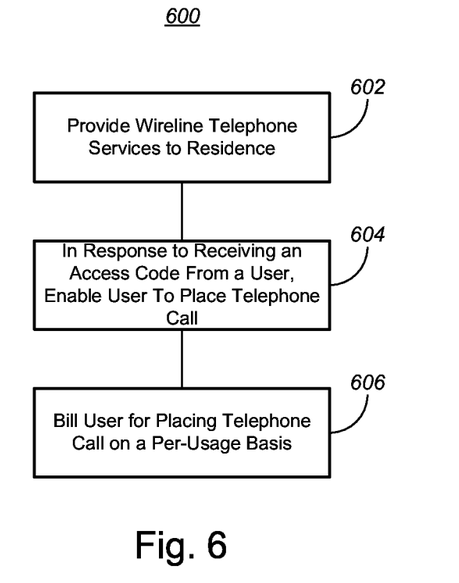
FIG. 6 is a flowchart of an exemplary process for providing wireline telephone services.

Referring to FIG. 6, an exemplary process 600 may start at step 602, where wireline telephone services may be provided to a residence. At step 604, a user may be enabled to place telephone calls in response to receiving an access code from the user. The access code may include an "*" followed by a code that is either standard (e.g., "*22"), established by a customer, or otherwise. In one embodiment, no access code is used to call non-emergency personnel (e.g., "911") or information personnel (e.g., "0"). At step 660, the user may be billed for placing the telephone calls on a per-usage basis. The user may not be billed for any services other than placing the telephone calls. Alternatively, the user may be billed a nominal charge for maintaining the wireline telephone service. In addition, in enabling the user to place telephone calls, a temporary telephone number from among a pool of available telephone numbers may be assigned to the user during the telephone call. In billing the user, the billing may include fees for an entire month of wireline telephone services. Furthermore, the billing may include a minimum amount for each telephone call plus additional charges based on a call type. The call type may include local, long distance, or out-of-country calls, and each call type may have a minimum amount associated therewith plus a variable amount, such as duration of call.

The previous detailed description is of a small number of embodiments for implementing the invention and is not intended to be limiting in scope. One of skill in this art will immediately envisage the methods and variations used to implement this invention in other areas than those described in detail. The following claims set forth a number of the embodiments of the invention disclosed with greater particularity.

What is claimed:

1. A method for providing emergency wireline telephone services, the method comprising:
   activating an emergency service plan for a wireline telephone line in response to a selection by a user;
   providing emergency wireline telephone services to a residence to enable the user to place telephone calls using the wireline telephone line, in response to activation of the emergency service plan, wherein the wireline telephone line does not have an active non-emergency telecommunication service plan;
   enabling the user to place emergency telephone calls to emergency services;
   enabling the user to place telephone calls to parties other than emergency services in response to receiving an access code while restricting use of the wireline telephone line to emergency calls unless the access code is received; temporarily assigning a telephone number from among a plurality of available telephone numbers to the user when placing a telephone call; and
   billing the user for placing the emergency telephone calls and the telephone calls on a per-usage basis.

2. The method according to claim 1, wherein billing the user includes not billing the user for anything other than placing the emergency telephone calls and the telephone calls.

3. The method according to claim 1, wherein billing the user includes billing the user a nominal charge for maintaining the wireline telephone service.

4. The method according to claim 1, further comprising:
   offering the emergency service plan to the user to maintain the emergency wireline telephone services as an emergency telephone service in response to the user requesting to cancel a wireline telephone service.

5. The method according to claim 1, further comprising:
   enabling the user to place the emergency telephone calls without having to dial the access code.

6. The method according to claim 1, further comprising;
   establishing the access code that limits the emergency wireline telephone services to be used to call the parties in response to the user selecting the access code.

7. The method according to claim 1, wherein the telephone number is temporarily assigned to the user for a time period.

8. The method according to claim 1, wherein billing the user on a per-usage basis includes billing the user a minimum amount for each telephone call plus additional charges based on a call type.

9. A system for providing emergency wireline telephone service, the system comprising:
   a storage unit; at least one data repository stored on the storage unit; and
   a processing unit in communication with the storage unit and configured to communicate with said at least one data repository, said processing unit further configured to:
   activate an emergency service plan for a wireline telephone line in response to a selection by a user, wherein the wireline telephone line has no active non-emergency telecommunication service plan;
   receive a call request from the user in response to the emergency service plan being activated,
   implement the call request through a telecommunications network in response to the call request being associated with emergency services;
   request an access code to enable the user to access the telecommunications network in response to the call request being associated with parties other than the emergency services;
   implement the call request in response to determining that the access code is associated with the user as stored in said at least one data repository;
   restrict access to the wireline telephone line to emergency telephone calls unless the access code is received; wherein said processing unit is further configured to temporarily assign a telephone number from among a plurality of available telephone numbers in said at least one repository to the user when placing a telephone call; and bill the user for the call request on a per-usage basis.

10. The system according to claim 9, wherein the processing unit is further configured to bill the user for each call request.

11. The system according to claim 9, wherein said processing unit is further configured to not bill the user for anything other than placing telephone calls.

12. The system according to claim 9, wherein the processing unit is further configured to bill the user a nominal charge for maintaining the emergency wireline telephone service.

13. The system according to claim 9, wherein said processing unit is further configured to enable the user to place an emergency telephone call without having to dial the access code.

14. The system according to claim 9, wherein the processing unit is further configured to establish the access code that limits the emergency wireline telephone service to be used to call the parties other than the emergency services in response to the user entering the access code.

15. The system according to claim 9, wherein said processing unit is further configured to bill the user a minimum amount for each telephone call plus additional charges based on a call type.

16. A method for providing backup wireline telephone services, the method comprising:

activating a backup service plan for a wireline telephone line, in response to a selection by a user, wherein the wireline telephone line has no active non-emergency telecommunication service plan;

providing wireline telephone services to a residence to enable a user to place emergency telephone calls in response to the user selecting to activate the backup service plan;

restricting use of the wireline telephone line to emergency telephone calls unless an access code is received; temporarily assigning a telephone number to the backup service plan for a time period in response to a telephone call being placed; and billing the user exclusively for placing telephone calls.

* * * * *